United States Patent
Roberts

[11] 3,875,499
[45] Apr. 1, 1975

[54] GAS DETECTING SYSTEM
[75] Inventor: John A. Roberts, Lynnfield, Mass.
[73] Assignee: General Electric Company, Lynn, Mass.
[22] Filed: Dec. 26, 1973
[21] Appl. No.: 428,435

[52] U.S. Cl. .................................. 324/33, 73/40.7
[51] Int. Cl. .......................................... G01n 27/00
[58] Field of Search ....................... 324/33; 73/40.7

[56] References Cited
UNITED STATES PATENTS
2,996,661 8/1961 Roberts ............................... 324/33
3,144,600 8/1964 Roberts ............................... 324/33

OTHER PUBLICATIONS
Young, I. G., "The Sensitivity of Detectors for Gas Chromotography", Gas Chromotography, edited by Nobels et al., Academic Press, N.Y., 1961, pp. 75-83.

Primary Examiner—Alfred E. Smith
Assistant Examiner—Rolf Hille

[57] ABSTRACT

A gas detection system utilizing an ionic gas detector having an extended range of sensitivity adjustment obtained by signal and sample attenuation. Signal attenuation adjustment is obtained by use of a voltage divider in the detector output circuit. Sample attenuation is obtained by adjusting the ratio of sample and diluent gases with control valves and calibrated orifices. Both adjustments are made with a single sensitivity controller.

12 Claims, 2 Drawing Figures

3,875,499

GAS DETECTING SYSTEM

BACKGROUND OF THE INVENTION

The present invention relates to a gas detection system of the type utilizing an ionic gas detector and, more particularly, to an improved sensitivity control which extends the useful operating range of such a system.

It is known to detect leaks in vessels, pipes and other closed systems through the presence of certain tracer gases or vapors which pass into the surrounding atmosphere and are drawn through a probe into a gas detector to detect the presence of such gases or vapors. The system may include an ionic gas detector in which the gas to be detected induces ions at a rate which varies with the concentration of the detected gas. These ions are collected at oppositely charged emitter and collector electrodes and produce a current in an output circuit indicative of the concentration of the gas to be detected. A method and apparatus for detection by such a method is described in U.S. Pat. No. 2,550,498 — Rice.

A common use of such ionic gas detectors is to detect the presence of halogens and their compounds. In order to detect widely varying concentrations of such substances, prior art halogen leak detectors have provisions for adjusting the sensitivity of the detector in order to extend the useful range of the leak detector. One such arrangement is shown in U.S. Pat. No. 3,144,600 — Roberts which utilizes electrical attenuation of the detector output signal to extend the useful operating range. While this arrangement extends the range on the low leak end of the scale, it does not extend the upper, high-rate end of the scale which is limited to about $1 \times 10^{-5}$ cc/sec. and concentration of halogen compound gases up to 0.2 parts per million (PPM). When these limits are exceeded degraded operation of the detector results. This is manifested in decreased sensitivity of the detector and a non-linear response characteristic due to a saturating effect which adversely affect the accuracy and reliability of the detector.

In order to extend the upper flow rate end of the detector scale, it is known to replace a portion of the sample gas with halogen-free air and provide a variable orifice in the probe to continuously vary the ratio of the sample gas to the diluent gas. Such an arrangement is shown in U.S. Pat. No. 2,996,661 — Roberts. While this arrangement may be used to extend the upper end of the leak rate range it is difficult for the operator to coordinate the gas ratio adjustment with the electrical attenuation adjustment and this increases the possibility of operator error in calibrating and using the system.

Accordingly, it is an object of this invention to provide a gas detection system utilizing an ionic gas detector having an improved sensitivity control system which expands the useful range of the system and which is relatively foolproof in operation.

A further object of the invention is to provide an improved sensitivity control for a leak detector system which provides a continuous and uniform adjustment of sensitivity control over a wider range of leak rate detection than has heretofore been possible.

Further objects and advantages of the invention will become apparent as the following description proceeds.

SUMMARY

Briefly, in accordance with the invention, a gas detector system is provided which utilizes, in a combined and coordinated manner, two types of output attenuation actuated by a single sensitivity control. One type of attenuation called signal attenuation, acts to proportionally reduce the electrical signal output of the gas detector in discrete steps. The other type, called sample attenuation, acts to change the ratio of the sample gas to a diluent gas fed to the detector, also in discrete steps. Both types of attenuation are coordinated and controlled by the sensitivity controller, providing uniform sensitivity adjustment over a wide range of leak rates. The sample attenuation ratio is sufficiently high that saturation effects of the detector are avoided for leak rates as high as $3 \times 10^{-3}$ cc/sec. Also, because the number of sensitivity adjustment positions is the product of the number of the combined signal and sample attenuation steps, a large number is easily obtained thereby enhancing the accuracy of the instrument.

For a better understanding of the invention, reference should be made to the following detailed description taken in connection with the accompanying drawings.

DESCRIPTION OF THE ILLUSTRATED EMBODIMENT

Figure 1:
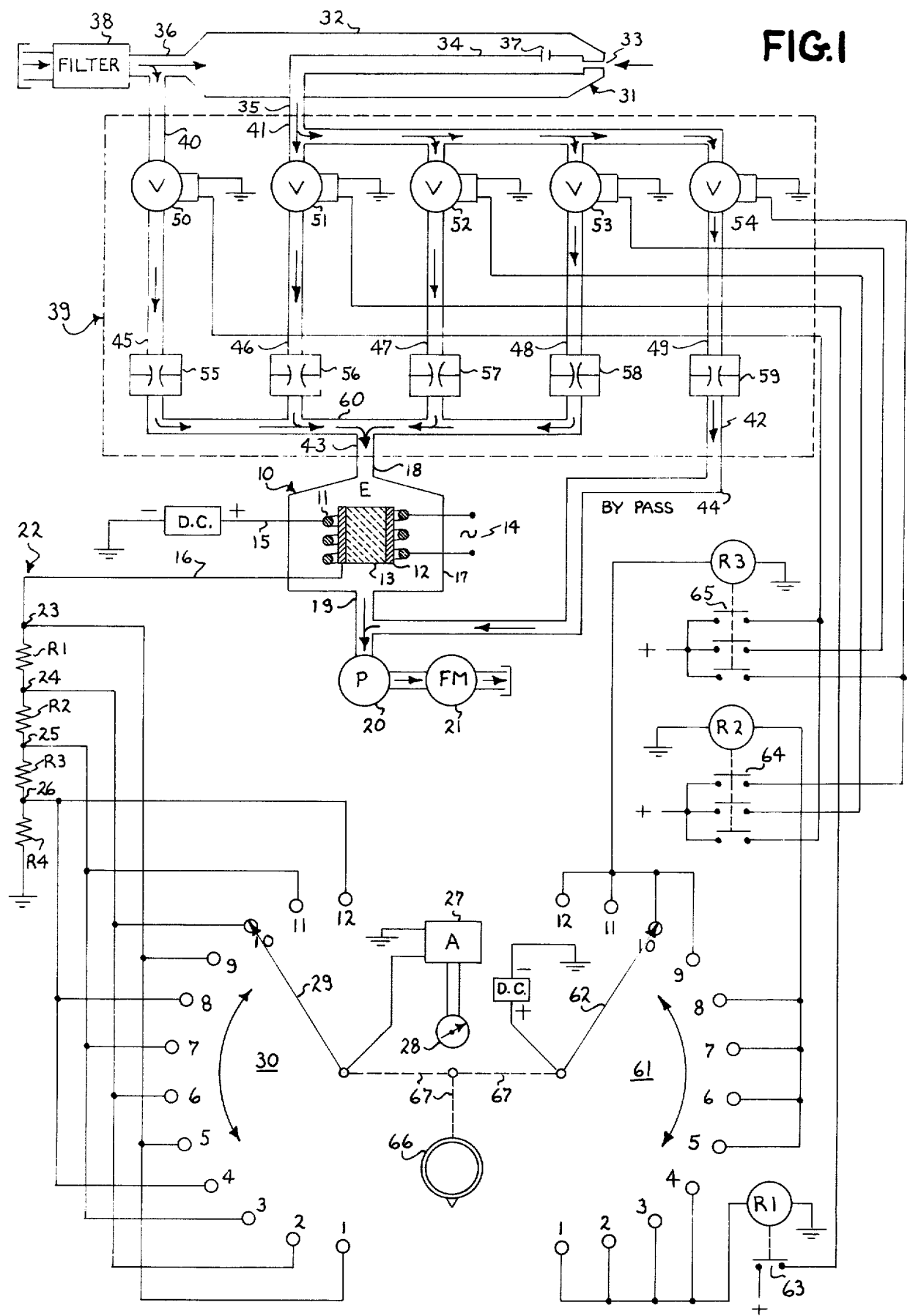
FIG. 1 is a schematic representation of a gas detection system embodying the subject invention.

Referring now to FIG. 1 of the drawing, there is disclosed for illustration a leak detection system which utilizes an ionic gas detector 10 of the type which is sensitive to halogen gases and their compounds. The detector may, for example, be similar to the one disclosed and described in U.S. Pat. No. 3,483,359 — Hewlett and Roberts. As shown, the detector has an ion-emitting electrode 11 in the form of a helix surrounding and spaced from an ion-collecting electrode 12 supported on an insulating core 13. The electrode 11 is electrically heated by an A.C. source 14 and is connected to the positive side of a D.C. source by lead 15. Another lead 16 carries D.C. current from the detector to an output circuit to be further described.

The gas sensitive element of the detector 10 is enclosed in a suitable housing 17 having an inlet conduit 18 and an outlet conduit 19. Sample gas to be detected is pumped through the detector via inlet and outlet conduits 18 and 19 by a vacuum pump 20 which discharges the pumped gas to the atmosphere via a flowmeter 21 used to adjust the gas pumping rate.

The halogen gas detector is characterized by the fact that when gas flowing between the electrodes contains a halogen or halogen compound, ions are formed at the ion-emitting positive electrode 11. They are attracted to the negatively charged electrode 12 causing a D.C. current to flow in the detector output circuit connected to lead 16. Within the operating range of the detector, the magnitude of the output current varies in accordance with the concentration of the halogen in the detector. In actual practice, a detector of this type operates well in atmospheres containing up to 0.2 PPM of halogen compound gases.

The detector output on lead 16 is connected to the grounded side of the D.C. source through a signal attenuator 22 consisting of four series-connected resistors $R_1$, $R_2$, $R_3$ and $R_4$ forming a voltage divider across which signal voltages proportional to detector output currents are developed at taps 23, 24, 25 and 26. These voltages are fed to an amplifier 27 and an output meter 28 through the rotary contact arm 29 of a signal attenuator control switch 30. It will be noted that the switch 30 has stationary contacts at successive switch positions numbered 1 to 12 which are connected to the voltage taps 23, 24, 25 and 26. As the switch arm 29 is moved from positions 1 to 4 the taps 23, 24, 25 and 26 are successively connected to meter 28 for increasing degrees of signal attenuation and hence changes in sensitivity of the meter. As the switch arm is rotated from position 5 to 8 the attenuation connection pattern is repeated a second time and for a third time as the switch arm moves from position 9 to 12. The reason for this repetition in the signal attenuation pattern will become apparent as the description proceeds.

In using the system to detect a possible leak in a pipe, vessel or other closed system containing a halogen as a tracer gas, a probe 31 is used to collect a leak sample which is fed to the inlet 18 of the detector 10. The probe has an elongated cylindrical housing 32 provided at its outer end with an opening 33 through which a leak sample is drawn by pump 20. The leak sample enters an inner coaxial mixing pipe 34 connected to a probe discharge conduit 35. Within the probe the leak sample is mixed with a diluent gas entering the probe through a rear conduit 36 and entering the mixing pipe through an orifice 37.

The diluent gas may be any gas to which the detector 10 does not respond. In the arrangement shown the diluent gas is purified air which is drawn through a filter 38 containing a substance such as activated charcoal which removes any trace of halogen existing in the ambient air as a contaminant. The purpose of mixing the diluent gas with the leak sample in the probe is to reduce the effect of atmosphere halogens on the detector. A suitable ratio determined by the size of orifice 37 is 9 parts of diluent gas to 1 part of leak sample. The resulting flow of mixed gas through probe outlet 35, hereinafter referred to as sample gas, has an adequate concentration of leak sample to detect all normal leak rates.

In accordance with the invention the sample gas from probe outlet 35 is fed to the detector inlet 18 through a gas mixing and flow rate proportioning device hereinafter referred to as a sample attenuator indicated generally by numeral 39.

The function of the sample attenuator is to attenuate the detector response by mixing the sample gas from probe outlet 35 with diluent gas from filter 38. This is done by adjusting the flow rates of the sample gas and diluent gas to obtain a predetermined ratio of the two gases and further providing a sensitivity control to change this ratio in discrete steps. In order to avoid an undesired change in the response time of the system or sensitivity of the detector the ratio change is made without substantially affecting the leak sample flow rate through the probe or the gas flow rate through the detector. The manner in which sample attenuator works to accomplish this function will now be described.

The sample attenuator has two inlets 40 and 41 and two outlets 42 and 43. Inlet 40 is connected to receive diluent gas from filter 38 while inlet 41 is connected to receive the sample gas flow from probe outlet conduit 35. Outlet 43 is connected to inlet 18 of detector 10 and outlet 42 is connected via a bypass conduit 44 to pump 20 on the downstream side of detector 10.

The sample attenuator comprises five conduits 45, 46, 47, 48 and 49 through which gas flow is controlled by electrically operated valves 50, 51, 52, 53 and 54. The flow of gas through these conduits is proportioned by a calibrated orifice in each conduit numbered 55, 56, 57, 58 and 59.

The conduit 45 is connected to inlet 40 and functions to supply the diluent gas which is mixed with the sample gas flowing in conduit 60 the mixture leaving outlet 43 and entering the detector inlet 18. The conduits 46, 47 and 48 are connected in parallel having a common inlet 41 and a common outlet 60.

The conduit 49 functions to bypass some of the sample gas entering inlet 41 by connecting to the bypass conduit 44.

In operation the attenuator valves are operated in a predetermined sequence to change the percent of sample gas entering the detector from 100% to 10% to 1% and vice versa in three discrete steps as follows:

In step 1, valve 51 is opened while the other valves remain closed. All of the sample gas leaving the probe through conduit 35 passes through conduits 46 and 60 and enters detector 10 so that the percent sample is 100%.

In step 2, valves 50, 52, and 54 are opened. The diluent gas then flows through conduit 45 and mixes with sample gas flowing through conduits 47 and 60. To maintain the flow of gas to the detector approximately constant some of the sample gas is bypassed through conduits 49 and 44. The calibrated orifice 57 is smaller than orifice 56 so that the percent of sample gas is, by design, 10%.

In step 3, valves 50, 53 and 54 are opened. In this case the diluent gas flows through conduit 45 and mixes with the sample gas flowing through conduits 48 and 60. The bypass connection is open again as in step 2. The flow of sample gas to the detector is through calibrated orifice 58 which is smaller than orifices 56 and 57 so that the percent of sample gas is, by design, 1%.

The sequencing of the valves 50–54, inclusive, to perform the three attenuation steps described above is accomplished by a sample attenuator control switch 61 and relays R1, R2, and R3. It will be noted that this switch has successive switch positions numbered 1–12, inclusive, corresponding to twelve positions on signal attenuator control switch 30. As a rotary switch arm 62 is moved to any of the positions 1–4, inclusive, relay R1 is energized closing its contacts 63 to open valve 51 for step 1 sample attenuation; i.e., 100% sample.

As the switch arm 62 is moved to any of the positions 5–8, inclusive, relay R2 is energized closing its contacts 64 to open valves 50, 52 and 54 for step 2 sample attenuation; i.e., 10% sample.

As the switch arm 63 is moved to any of the positions 9–12, inclusive, relay $R_3$ is energized closing its contacts 65 to open valves 50, 53 and 54 for step 3 sample attenuation; i.e., 1% sample.

In order to simplify sensitivity adjustment in using the system and provide foolproof control for an operator, the signal attenuator control switch 30 and the sample attenuator control switch 61 are ganged so as to be positioned by a single sensitivity control knob 66 the mechanical interconnection being represented by the dash lines 67. The control is such that the switches 30 and 61 occupy corresponding positions at the same time. Thus, a movement of knob 66 to position switch 30 from position 1 to 2 also moves switch 61 from position 1 to 2, etc. This arrangement makes possible a coordination of the two attenuation controls to achieve a uniform change in sensitivity of the system over a wide range of leak rates. Also attenuation by dilution of the sample gas makes it possible to measure higher leak rates without danger of raising the concentration of halogen gas in the detector to the point where it becomes inoperative because of saturation. An example of the way in which this invention makes possible a wide range of sensitivity control by coordinating signal and sample attenuation controls is given by the following table. This table shows, for a halogen detector of current design, the relationship between the full scale output of the detector in microamperes (UA) for three sample attenuation steps and four signal attenuation steps to achieve a range of leak rate detection extending over six decades.

TABLE 1

| Switch Position | Range of Leak Rates cc/sec. | % Sample | F.S. Output, UA |
|---|---|---|---|
| 1 | $0-10\times10^{-9}$ | 100 | 0.02 |
| 2 | $0-3\times10^{-8}$ | 100 | 0.067 |
| 3 | $0-10\times10^{-8}$ | 100 | 0.20 |
| 4 | $0-3\times10^{-7}$ | 100 | 0.67 |
| 5 | $0-10\times10^{-7}$ | 10 | 0.20 |
| 6 | $0-3\times10^{-6}$ | 10 | 0.67 |
| 7 | $0-10\times10^{-6}$ | 10 | 2.0 |
| 8 | $0-3\times10^{-5}$ | 10 | 6.7 |
| 9 | $0-10\times10^{-5}$ | 1 | 2.0 |
| 10 | $0-3\times10^{-4}$ | 1 | 6.7 |
| 11 | $0-10\times10^{-4}$ | 1 | 20. |
| 12 | $0-3\times10^{-3}$ | 1 | 67. |

Figure 2:
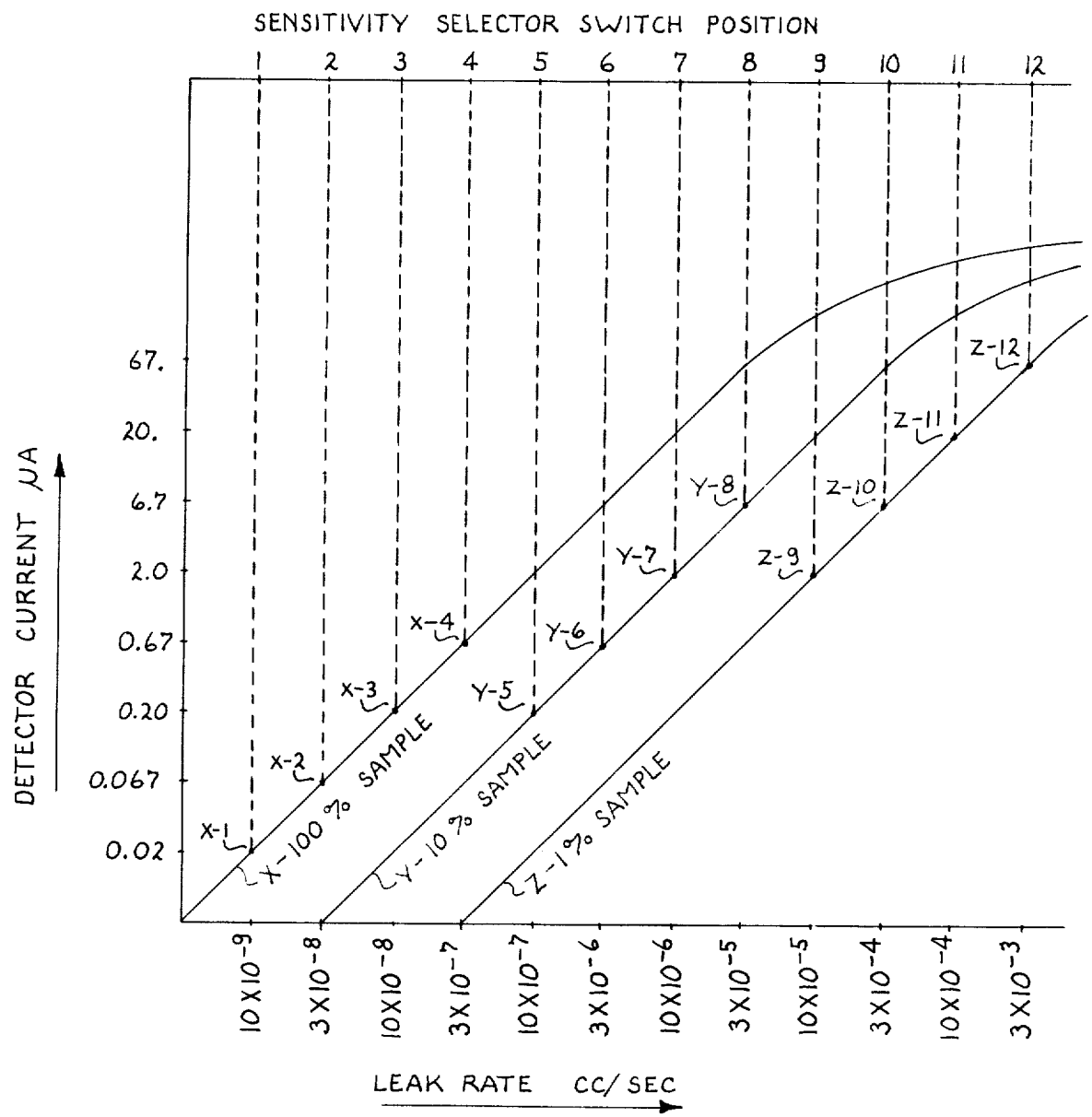
FIG. 2 is a graphical representation of the response characteristics of the system useful in explaining the operation of the invention.

The tabular data in Table 1 is reproduced in graphical form in FIG. 2 to facilitate an understanding of how the sensitivity control works.

Referring now to FIG. 2, the graphical representation shows the response characteristics of the detector 10 in terms of output current in UA vs. the detected leak rate from $10\times10^{-9}$ cc/sec. up to $3\times10^{-3}$ cc/sec. which is the operative range of the subject leak detection system. The curve X shows the response characteristic when the sample attenuator control is in the step 1 position for 100% sample. It will be noted that curve X becomes non-linear due to saturation of the detector when the leak rate exceeds about $3\times10^{-5}$ cc/sec. with an output of 67 UA. Curve Y shows the characteristic for 10% sample, step 2, and curve Z corresponds to 1% sample, step 3. Curves Y and Z are identical to X except that Y is displaced upscale in leak rate one decade while curve Z is displaced two decades. When operating the detector on curve Z, saturation does not begin to occur until the leak rate exceeds $3\times10^{-3}$ cc/sec. so that the range is expanded on the high leak rate end two decades with a combined measurement span of 6 decades in leak rate.

The scale at the top of the graph shows the switch positions for the attenuator switches 30 and 61 corresponding to the leak rate range shown at the bottom. During the first four positions curve X applies for 100% sample. The data points X1, X2, X3 and X4 show the detector output current for switch positions 1, 2, 3 and 4 which gives full scale deflection of the output meter 28. The uniform spacing of these points results from selecting the relative values of resistors R1, R2, R3 and R4 to give signal attenuation in logical step ratios such as 1, 3, 10, 30 etc.

On curve Y 10% sample the data points Y-5, Y-6, Y-7 and Y-8 show the detector output current for switch positions 5, 6, 7 and 8 giving full scale deflection for meter 28. Similarly, on curve Z for 1% sample the data points Z9, Z10, Z11 and Z12 show the detector output current for full scale meter deflection in switch positions 9, 10, 11 and 12. It will be noted that the continuous and uniform spacing of the sensitivity control points which enhances the accuracy and ease of the measurement, results from a repetition of the signal attenuation ratios by control switch 30 after each step change of the sample attenuation ratio by the sample attenuation control switch 61. This pattern occurs automatically in a foolproof manner when an operator moves the control knob 66 through the twelve control positions. Also by combining the action of the signal and sample attenuators in the manner described, a large number of sensitivity control positions are obtained with a few changes of the ratio of sample gas to diluent gas. This simplifies the construction of the sample attenuator 39.

While the sample attenuator 39 described above requires the use of switch controlled, electrically operated valves it will be apparent that mechanically operated valves may also be used. Thus a plug valve with a central rotor for performing the various valving functions may be used by mechanically coupling the rotor to the signal attenuator switch 30.

While there has been shown and described a leak detection system presently considered to be a preferred embodiment of the invention, it will be apparent to those skilled in the art that various changes and modifications may be made therein without departing from the spirit and scope of the invention.

What is claimed as new and desired to be secured by Letters Patent of the United States is:

1. A gas detector system comprising:
   a. a gas leak detector sensitive to a particular gaseous substance to be detected,
   b. a gas sampling probe through which a sample gas is drawn,
   c. a source of diluent gas to which the detector does not respond,
   d. conduit means connected to supply sample gas from said probe and diluent gas from said source to said detector,
   e. a detector sensitivity control having a plurality of control positions,
   f. valve means responsive to actuation of the sensitivity control from one operative position to another to alter the relative flow rates of the sample gas and the diluent gas through said conduit means in a discrete step and thereby change the ratio of sample gas to diluent gas reaching the detector; and
   g. a bypass conduit arranged to bypass a portion of the gas flow from the probe around the gas detector so as to maintain the total gas flow through the detector relatively constant when the sensitivity control is activated to different control positions.

2. The gas detector system of claim 1 wherein the bypass conduit includes a calibrated orifice and valve means actuated by the sensitivity control.

3. The gas detector system of claim 1 including additional conduit means connected in parallel with the conduit means supplying sample gas from the probe to the detector, said additional conduit means having valves controlling the flow of gas therethrough which are operated in sequence when the sensitivity control is moved to different operative control positions.

4. The gas detector system of claim 3 wherein the additional conduit means have calibrated orifices of progressively different sizes.

5. In a gas detector system,
 a. a gas detector sensitive to a particular gaseous substance to be detected, said detector producing an electrical output signal variable in accordance with the concentration of said gaseous substance in the detector,
 b. a meter connected in a signal circuit to be actuated in accordance with the magnitude of said output signal,
 c. a gas sampling probe through which a sample gas is drawn,
 d. a source of diluent gas to which the detector does not respond,
 e. conduit means for supplying sample gas and diluent gas from said probe and source to said detector,
 f. sample attenuating means for altering the ratio of sample gas to diluent gas supplied to the detector,
 g. signal attenuating means for altering the ratio of the signal supplied to the meter to the total output signal of the detector; and
 h. sensitivity control means connected to actuate jointly the sample attenuating means and the signal attenuating means to vary the sensitivity of the detector over an extended range of operation.

6. A gas detection system of claim 5 wherein the gas detector is a halogen sensitive type and the source of diluent gas is air from which any halogen containing substance has been removed by filtration.

7. The gas detection system of claim 5 wherein the sample attenuating means and signal attenuating means operate in discrete steps of progressive attenuation magnitude.

8. The gas detection system of claim 7 wherein the signal attenuating means operates through a plurality of steps of progressive attenuation magnitude for each step change of the sample attenuation means.

9. The gas detection system of claim 5 in which the sample attenuation means comprises valves and calibrated orifices in the conduit means supplying gas to the detector, the valves being actuated in a predetermined sequence by the sensitivity control.

10. The gas detection system of claim 9 in which the sample attenuation means includes electrically actuated valves and a rotary switch connected to actuate the valves.

11. The gas detection system of claim 10 wherein the signal attenuation means comprises a rotary switch connected to resistance taps of a voltage divider in the signal circuit.

12. The gas detection system of claim 11 wherein the rotary switches controlling the signal and sample attenuating means are ganged to be rotated in unison by the sensitivity control means.

* * * * *